(12) United States Patent
Kingdon et al.

(10) Patent No.: US 7,202,447 B2
(45) Date of Patent: Apr. 10, 2007

(54) CONVEYOR TYPE OVEN

(76) Inventors: Charles J. Kingdon, 816 Canongate Dr., Flower Mound, TX (US) 75022; Christopher J. Adelmann, 583 Oakbend Dr., Coppell, TX (US) 75019; Abel Anthony Arellano, 10919 Robincreek La., Frisco, TX (US) 75035; Joe Louis Gallardo, 3442 N. Beltline Rd., No. 2075, Irving, TX (US) 75062

( * ) Notice: Subject to any disclaimer, the term of this patent is extended or adjusted under 35 U.S.C. 154(b) by 10 days.

(21) Appl. No.: 10/817,463

(22) Filed: Apr. 2, 2004

(65) Prior Publication Data

US 2005/0236385 A1   Oct. 27, 2005

(51) Int. Cl.
*A21B 1/22* (2006.01)
*A21B 1/48* (2006.01)
*F27B 9/36* (2006.01)
*F27D 11/02* (2006.01)

(52) U.S. Cl. ............... 219/388; 219/396; 219/409; 219/410; 219/411; 99/443 C

(58) Field of Classification Search ........... 219/388, 219/409–411, 405; 99/386, 443 C; 426/523
See application file for complete search history.

(56) References Cited

U.S. PATENT DOCUMENTS

| | | | | |
|---|---|---|---|---|
| 3,087,418 A | * | 4/1963 | Albright | 426/243 |
| 3,528,362 A | * | 9/1970 | Arnold, Jr. | 99/357 |
| 3,809,859 A | * | 5/1974 | Wells | 392/435 |
| 4,188,866 A | * | 2/1980 | Baker et al. | 99/339 |
| 4,245,613 A | * | 1/1981 | Wells et al. | 219/388 |
| 4,404,898 A | * | 9/1983 | Chaudoir | 99/331 |
| 4,446,358 A | * | 5/1984 | Comerford et al. | 219/388 |
| 4,554,437 A | * | 11/1985 | Wagner et al. | 219/388 |
| 4,945,212 A | * | 7/1990 | Gogan et al. | 219/388 |

(Continued)

Primary Examiner—Joseph Pelham
(74) Attorney, Agent, or Firm—Sanford E. Warren, Jr.

(57) ABSTRACT

A conveyor type oven (10) for processing food products (32) and a method of use that includes heating sections and/or zones, each of the heating sections/and or zones being individually temperature controlled. The conveyor type oven (10) comprises an oven housing (12) forming an oven cavity (14), the oven housing (12) having an inlet opening (16) and an exit opening (18) each in communication with the oven cavity (14), a conveyor system (20) disposed through the inlet opening (16), the oven cavity (14), and the exit opening (18) for transporting food products (18) through the oven cavity (14) for processing the transported food product (32), a first heating section (22) forming a first heating zone (38) disposed within the oven housing (12) positioned on one side of the conveyor (20), the first heating section (38) includes a first type of radiant heat emitter (36) focusing radiant heat toward the conveyor (20); a second heating section (24) disposed within the oven housing and positioned on an opposing side of the conveyor (20) from the first heating section (22), the second heating section (24) may include an inlet heating zone (44) and an outlet heating zone (46), each of the inlet and outlet heating zones having a second type heat emitter (40) substantially focusing radiant heat toward the conveyor (20), and a temperature control system (26) connected to the heat emitters (36, 40) of the first heating zone (38), the inlet heating zone (44), and the outlet heating zone (44) in a manner to monitor and selectively control the temperature of each heating zone separately from the temperature control of the other heating zones.

4 Claims, 3 Drawing Sheets

U.S. PATENT DOCUMENTS

| | | | |
|---|---|---|---|
| 4,951,648 A * | 8/1990 | Shukla et al. | 126/21 A |
| 5,197,375 A * | 3/1993 | Rosenbrock et al. | 219/388 |
| 5,223,290 A | 6/1993 | Alden | |
| 5,906,485 A | 5/1999 | Groff et al. | |
| 5,919,039 A * | 7/1999 | Shaw et al. | 219/388 |
| 6,075,230 A * | 6/2000 | Wilson | 219/544 |
| 6,294,769 B1 * | 9/2001 | McCarter | 219/544 |
| 6,369,360 B1 | 4/2002 | Cook | |
| 6,452,137 B1 | 9/2002 | Kariya | |
| 6,608,288 B2 | 8/2003 | Maahs | |
| 6,707,014 B1 * | 3/2004 | Corey et al. | 219/494 |
| 6,817,283 B2 * | 11/2004 | Jones et al. | 99/386 |

\* cited by examiner

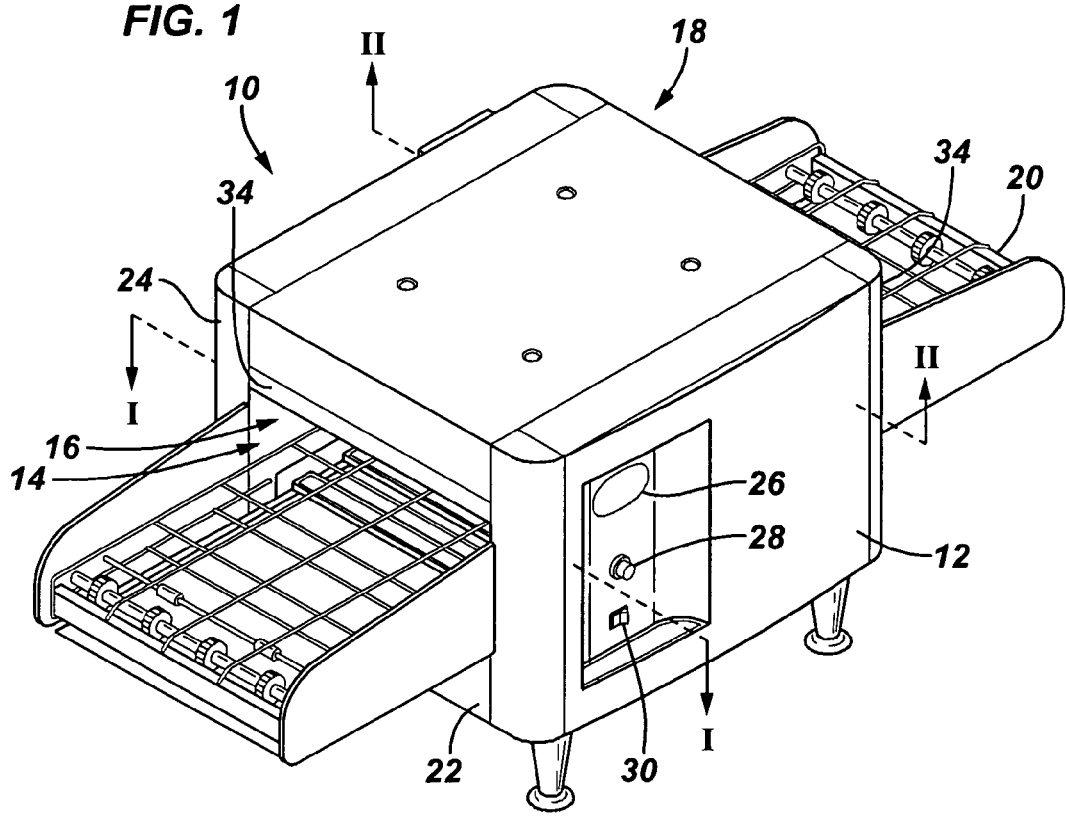
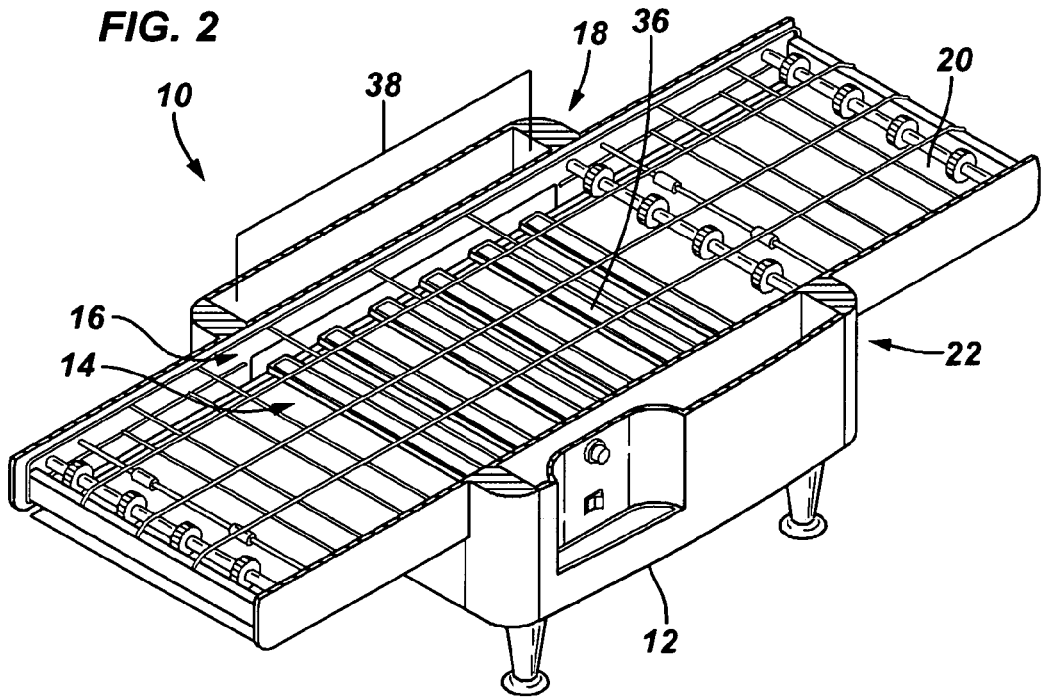

CONVEYOR TYPE OVEN

FIELD OF THE INVENTION

The present invention relates in general to ovens and more specifically to a conveyor type oven for reheating, toasting, and/or cooking food products.

BACKGROUND

Conveyor type ovens have been used for many years in commercial enterprises for heating and/or cooking food items. Conveyor type ovens include a conveyor for transporting food products through the oven. The oven often has one or more heating elements spaced about the conveyor for heating the oven cavity and the food product passed therethrough. These prior art ovens rely on high velocity hot air, infrared, radiant, or convection type heating elements to treat the food products passing through the oven.

A drawback with the prior art conveyor type ovens is the wasted energy produced in reheating, toasting, or cooking of the food product. Often the prior art conveyor type ovens utilize a round bar type emitter that emits infrared waves in at least a 180 degree arc thereby heating the entire oven cavity and limiting the emissions directed toward the conveyor and the carried food product. Another drawback of the prior art conveyor type ovens is that the heating elements of the oven are controlled to maintain a constant air temperature within the oven cavity. Therefore, when a cold or frozen food is introduced into the oven on the conveyor the heating elements are charged to maintain a set air temperature in the oven cavity. This adjustment in the temperature of all of the heating elements wastes energy and increases the cost of operation of the oven and often results in an unacceptable food product.

It is thus a desire of the present invention to provide a conveyor type oven that provides desired heating, cooking, or toasting of a food product in an expedited manner while limiting energy consumption. It is a further desire to provide a conveyor type oven that includes a first heating section located on a first side of the conveyor that focuses energy substantially toward the conveyor, and a second heating section located on a second side of the conveyor that directs energy substantially toward the conveyor. It is a further desire for the second heating section to be divided into two separate zones wherein each zone includes at least one heating element that is controlled to maintain a set surface temperature separate from the other heating zones. It is a still further desire to provide a conveyor type oven that includes a plurality of heating zones wherein each heating zone includes independent heating elements that are operated to maintain a substantially constant temperature within the heating zone.

SUMMARY OF THE INVENTION

In view of the foregoing and other considerations, the present invention relates to conveyor type ovens for heating, toasting, or cooking food products.

It is a benefit of the present invention to provide a conveyor type oven having a first heater section including a heat emitter of a first type positioned on one side of a conveyor and a second heater section having heat emitters of a second type positioned on the opposing side of the conveyor.

It is a further benefit of the present invention to provide a conveyor type oven wherein the heat emitting elements substantially focus the emitted energy toward the conveyor and carried food product.

It is a still further benefit of the conveyor type oven of the present invention to provide a plurality of heating zones, each heating zone including at least one heat emitting element that is controlled to maintain a substantially constant surface temperature.

Accordingly, a conveyor type oven for processing food products and a method of use is provided that includes heating sections, each of the heating sections being individually temperature controlled, and wherein each of the heating sections may include independently controlled heating zones. The conveyor type oven of the present invention comprises an oven housing forming an oven cavity, the oven housing having an inlet opening and an exit opening each in communication with the oven cavity, a conveyor system disposed through the inlet opening, the oven cavity, and the exit opening for transporting food products through the oven cavity for processing the transported food product, a first heating section forming a first heating zone disposed within the oven housing positioned on one side of the conveyor, the first heating section including a first type of radiant heat emitter focusing radiant heat toward the conveyor; a second heating section disposed within the oven housing and positioned on an opposing side of the conveyor from the first heating section, the second heating section having an inlet heating zone and an outlet heating zone, each of the inlet and outlet heating zones having a second type heat emitter directing radiant heat therefrom substantially toward the conveyor, and a temperature control system connected to the heat emitters of the first heating zone, the inlet heating zone, and the outlet heating zone in a manner to monitor and selectively control the temperature of each heating zone separately from the temperature control of the other heating zones.

A method of processing food products is provided comprising the steps of transporting a food product through an oven cavity for processing, emitting radiant heat from a first heating zone toward the food product within the oven cavity, wherein the radiant heat is emitted from a first type of heat emitter, emitting radiant heat from an inlet heating zone toward the food product within the oven cavity, wherein the radiant heat is emitted from a second type of heat emitter, emitting radiant heat from an outlet heating zone toward the food product within the oven cavity, wherein the radiant heat is emitted from a second type of heat emitter, and controlling the temperature of each of the first heating zone, the inlet heating zone, and the outlet heating zone individually.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein:

FIG. 1 is a representative view of a conveyor oven of the present invention;

FIG. 2 is a representative view of the conveyor oven of FIG. 1 along the line I—I revealing the first heating section;

DETAILED DESCRIPTION

Figure 2A:
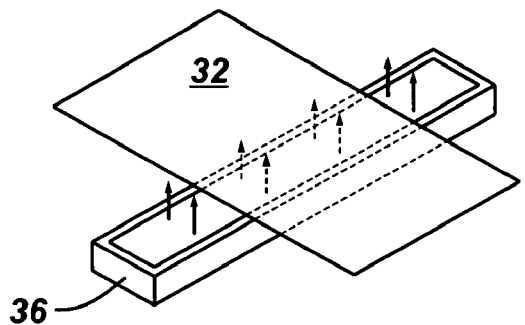
FIG. 2A is a representative view of a flat bar heat emitter.

Refer now to the drawings wherein depicted elements are not necessarily shown to scale and wherein like or similar elements are designated by the same reference numeral through the several views.

FIG. 1 is a representative view of a conveyor oven of the present invention generally designated by the numeral 10. Conveyor oven 10 includes an oven housing 12 forming an oven cavity 14 having an inlet opening 16 and an exit opening 18, a conveyor 20, a first heating section 22, a second heating section 24, a temperature control system 26, a conveyor speed control 28, and an on/off switch 30.

Oven housing 12 is constructed of material familiar to those skilled in the art forming an oven cavity 14. Oven housing 12 includes an inlet opening 16 and an exit opening 18 in communication with oven cavity 14. A conveyor 20 extends through inlet opening 16, oven cavity 14, and exit opening 18. Conveyor 20 is a device such as a belt or chain driving device that moves items such as food product 32 (FIG. 2) along conveyor 20 and through oven cavity 14. Oven housing 12 further includes heating sections 22 and 24 for treating food product 32 carried on conveyor 20 through oven cavity 14.

Oven housing 12 may further include adjustable heat shields 34 movably positioned proximate inlet and exit openings 16 and 18. Heat shields 34 may be provided to maintain heat and infrared radiation within oven cavity 14. Heat shields 34 may be adjustable to define the size of inlet and/or exit openings 16 and 18 relative to food product 32 passing through oven cavity 14.

Oven housing 12 further includes first heating section 22 and second heating section 24. The first heating section 22 and the second heating section 24 are positioned within oven housing 12 on opposing side of conveyor 20. For descriptive purposes, first heating section 22 is positioned below conveyor 20 and second heating section 24 is positioned above conveyor 20. Pursuant to the invention the first and second heating sections 22 and 24 may be reversed in relation to conveyor 20. Heating sections 22 and 24 include heating elements that focus heat energy toward conveyor 20 within oven cavity 14.

FIG. 2 is a representative view of conveyor oven 10 of the present invention along the line I—I of FIG. 1 revealing first heating section 22. First heating section 22 comprises a flat-bar, infrared emitter 36. Emitter 36 may comprise a single heating element or numerous heating elements. Heat emitter(s) 36 and first heating section 22 may extend substantially along the length of oven cavity 14. First heating section 22 forms a first heat zone 38 that is controlled by temperature control system 26 that is shown and described in further detail in relation to FIGS. 1 and 4.

FIG. 2A is a representative view of a flat bar heat emitter 36 of the present invention. Emitter 36 may be a flat bar sheathed heat emitter having exposed resistance wires or coils. As shown, flat bar emitter 36 focuses infrared heat, as indicated by the arrows, toward food product 32 that is carried by conveyor 20 (FIGS. 1 and 2). Temperature control of heat emitter 36, and thus first heat zone 38, facilitates controlled processing of food product 32.

Figure 2B:
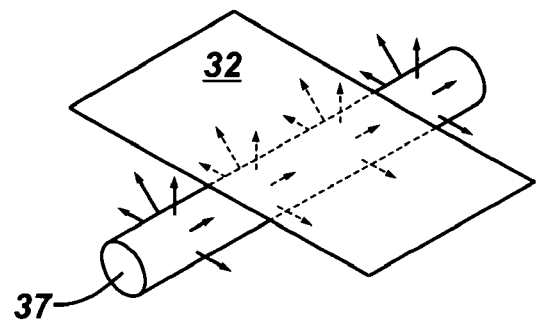
FIG. 2B is a representative view of a round type heat emitter utilized by prior art conveyor type ovens.

FIG. 2B is a representative view of a round type heat emitter 37 commonly utilized in the prior art conveyor type ovens. As shown by the arrows, infrared heat emitted from round type heater emitter 37 is directed in at least an arc of approximately 180 degrees. This distribution of emitted infrared heat increases energy use and the associated costs while failing to focus the desired emitted energy toward food product 32.

Figure 3:
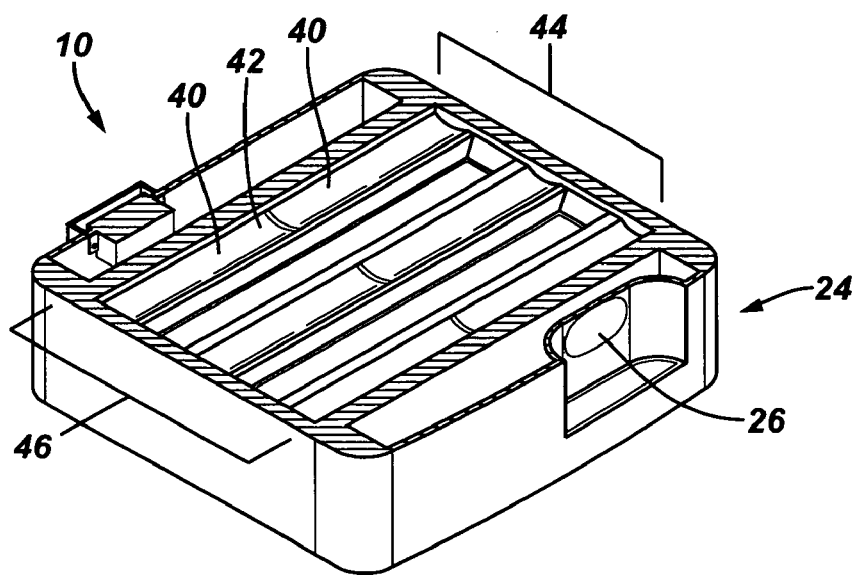
FIG. 3 is a representative view of a conveyor oven of the present invention along the line II—II of FIG. 1 revealing the second heating section.

FIG. 3 is a representative view of conveyor oven 10 of the present invention along the line II—II of FIG. 1 revealing second heating section 24. Second heating section 24 includes heat emitters 40 that are a second type of heat emitter of a type different from first section emitter 36 (FIG. 1). Heat emitters 40 may be a ceramic emitter having a heating wire (not shown) embedded therein. Ceramic emitters 40 are concave shaped having a concave face 42 that focuses infrared energy toward conveyor 20 (FIG. 1) and the carried food product. An example of ceramic emitter 40 is an emitter that provides watt densities from approximately 6 watts per square inch to 39 watts per square inch, wavelengths from approximately 2 to 7 micrometers, and temperatures up to approximately 700 degrees centigrade.

Second heating section 24 is divided into at least two heating zones. As shown in FIG. 3, heating section 24 includes an inlet heating zone 44 and an outlet heating zone 46, each zone 44 and 46 having at least one heat emitter 40. In relation to FIG. 1, inlet heating zone 44 is positioned proximate inlet opening 16 and outlet heating zone 46 is positioned proximate exit opening 18.

Each of the heating zones 44 and 46 of heating section 24 includes one or more ceramic heat emitters 40. The number of heat emitters 40 provided in each heat zone is a design choice related to the size of the oven cavity and the desired throughput of food products. Each heating zone 44 and 46 is independently controlled via temperature control system 26 further described in relation to FIG. 4.

Figure 4:
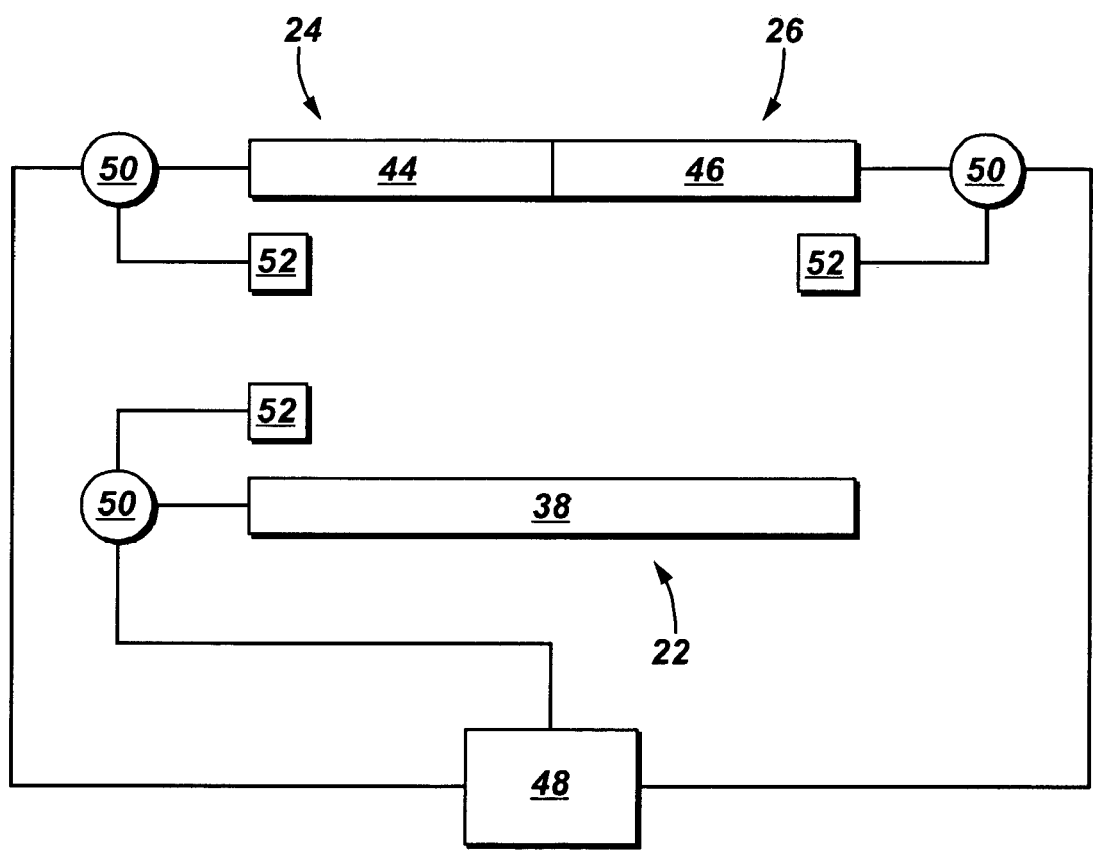
FIG. 4 is a block diagram of a temperature control system.

FIG. 4 is a block diagram of a temperature control system 26 of the present invention. Temperature control system 26 includes a digital controller 48, solid-state relays 50, and temperature sensors 52. Temperature sensors 42 may be a thermocouple functionally connected to emitters 36 and/or 40 so as to detect the temperature of the surface or face 42 of the emitter and/or the temperature proximate the emitter. Temperature control system 26 facilitates control of each heating zone 38, 44, and 46 without regard to the ambient temperature of oven cavity 14 (FIG. 1).

Each heating zone 38, 44, and 46 is connected to a digital controller 48 for providing a set point temperature for each of the heating zones. Temperature control system 26 further includes an individual heat sensor 52 in functional connection with each heat zone and the associated emitters 36 or 40 and controller 48 via an individual solid state relay 50. Temperature sensors 52 are positioned so as to substantially detect the temperature of the proximate heat emitter and thus facilitate control of the temperature of the heat emitter and associated heat zone as opposed to adjusting the temperature of the heat emitters in relation to the ambient temperature of the oven cavity.

A method of operation of the present invention is described in relation to FIGS. 1 through 4. A food product 32 is selected for processing through oven 10. An appropriate temperature and pass through time is selected for processing food product 32. An operator turns oven 10 on, sets a conveyor speed for passing product 32 through oven 10, and temperature control system 26 is set to the desired temperature for the particular food product 32.

Digital controller 48 may be programmed so that first heating zone 38 has a first set point temperature and the inlet and outlet heating zones 44 and 46 are programmed at a second set point temperature. As should be realized, each heating zone is defined as an area proximate the heat emitters for each section, the heat zone may be monitored and controlled by sensing the temperature of the surface of the heat emitter(s). Control system 26 operates to maintain each of the heating zones 38, 44, and 46 at the assigned set point temperature.

Food product 32 is placed on conveyor 20 so as to be introduced and carried through oven cavity 14. As food product 32, often cold or frozen, enters oven cavity 14 inlet heating zone 44 is controlled through digital controller 48 to maintain the temperature of heating zone 44. As food product 32 continues through oven cavity 14, outlet heating zone 46 reacts as necessary through digital controller 48 to maintain a constant temperature. Due to the initial heat maintenance by inlet heat zone 44, first heat zone 38 and outlet heat zone 46 do not require substantial temperature adjustment to sustain a selected set temperature, thus reducing energy consumption and providing for consistent quality of processing of food product 32. Additionally, the focused emission of infrared energy from emitters 36 and 40 toward conveyor 20 and food product 32 eliminates excess heat production for the purpose of heating oven cavity 14 as in the prior art conveyor ovens.

From the foregoing detailed description of specific embodiments of the invention, it should be apparent that a conveyor type oven and method that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow. For example, various materials of construction may be made, varying numbers and arrangement of heating zones in the heating sections are contemplated by the invention, and variations in the manner of sensing controlling the temperature of the emitters and heat zones may be made.

What is claimed is:

1. A conveyor type oven for processing food comprising:
   an oven housing forming an oven cavity, the oven housing having an inlet opening and an exit opening each in communication with the oven cavity;
   a conveyor system disposed through the inlet opening, the oven cavity, and the exit opening for transporting food products through the oven cavity for processing the transported food product;
   a first heating section forming a first heating zone disposed within the oven housing positioned on one side of the conveyor, the first heating section including a flat bar radiant heat emitter focusing radiant heat toward the conveyor;
   a second heating section disposed within the oven housing and positioned on an opposing side of the conveyor from the first heating section, the second heating section having an inlet heating zone and an outlet heating zone, each of the inlet and outlet heating zones having a ceramic heat emitter having a concave face directing radiant heat therefrom substantially toward the conveyor, and
   a temperature control system connected to the heat emitters of the first heating zone, the inlet heating zone, and the outlet heating zone in a manner to monitor and selectively control the temperature of each heating zone separately from the temperature control of the other heating zones.

2. The apparatus of claim 1 wherein the temperature control system substantially maintains the first heating zone at a first set temperature.

3. The apparatus of claim 1 wherein the temperature control system substantially maintains the inlet heating zone and the outlet heating zone at a second set temperature.

4. The apparatus of claim 2 wherein the temperature control system substantially maintains the inlet heating zone and the outlet heating zone at a second set temperature.

* * * * *